(12) United States Patent
Cho et al.

(10) Patent No.: US 8,846,159 B2
(45) Date of Patent: Sep. 30, 2014

(54) MOLD FOR FABRICATING BARRIER RIB AND METHOD OF FABRICATING TWO-LAYERED BARRIER RIB USING SAME

(75) Inventors: Han Sol Cho, Yongin-si (KR); Yong Young Park, Suwon-si (KR); Joon Yong Park, Yongin-si (KR); Young Mok Son, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 2 days.

(21) Appl. No.: 13/592,978

(22) Filed: Aug. 23, 2012

(65) Prior Publication Data

US 2013/0045336 A1 Feb. 21, 2013

Related U.S. Application Data

(63) Continuation of application No. 11/117,324, filed on Apr. 29, 2005, now abandoned.

(30) Foreign Application Priority Data

Nov. 25, 2004 (KR) ................................. 2004-97649

(51) Int. Cl.
| | | |
|---|---|---|
| *C08J 7/04* | (2006.01) | |
| *B05D 3/00* | (2006.01) | |
| *C08J 7/18* | (2006.01) | |
| *G21H 5/00* | (2006.01) | |
| *B05D 3/06* | (2006.01) | |
| *A01J 21/00* | (2006.01) | |
| *G02F 1/1335* | (2006.01) | |
| *H01J 9/24* | (2006.01) | |

(52) U.S. Cl.
CPC ............. *H01J 9/242* (2013.01); *H01J 2211/36* (2013.01); *G02F 1/133512* (2013.01)

USPC ............ 427/510; 425/385; 427/555; 427/558

(58) Field of Classification Search
USPC ......................................................... 427/510
See application file for complete search history.

(56) References Cited

U.S. PATENT DOCUMENTS

| | | | |
|---|---|---|---|
| 3,103,703 A | 9/1963 | Ludewig | |
| 3,323,983 A | 6/1967 | Palmer et al. | |

(Continued)

FOREIGN PATENT DOCUMENTS

| | | |
|---|---|---|
| EP | 0 434 447 A1 | 6/1991 |
| EP | 1 160 590 A2 | 12/2001 |

(Continued)

OTHER PUBLICATIONS

M Heckele and W K Schomburg. Review on micro molding of thermoplastic polymers. (Dec. 17, 2003) J. Micromech. Microeng. 14.*

(Continued)

*Primary Examiner* — Dah-Wei D Yuan
*Assistant Examiner* — Kristen A Dagenais
(74) *Attorney, Agent, or Firm* — Buchanan Ingersoll & Rooney PC (57) ABSTRACT

The disclosed mold includes recessed parts which have a shape corresponding to embossed portions of the barrier rib to be fabricated, and protruding parts which have a shape corresponding to depressed portions of the barrier rib to be fabricated, protrude adjacent to the recessed parts, and are tapered. The protruding parts and the recessed parts are arranged at regular intervals. It is possible to simply fabricate the two-layered barrier rib for inkjet application through a single embossing process at low cost using the mold for fabricating the barrier rib of the present invention.

12 Claims, 11 Drawing Sheets

(56) References Cited

U.S. PATENT DOCUMENTS

| | | |
|---|---|---|
| 4,174,367 A | 11/1979 | Breher |
| 4,464,326 A | 8/1984 | Nishihira |
| 4,913,639 A | 4/1990 | Wheeler |
| 4,935,184 A | 6/1990 | Sorensen |
| 5,954,625 A | 9/1999 | Giesler, Sr. |
| 6,036,909 A | 3/2000 | Baum |
| 6,184,621 B1 * | 2/2001 | Horiuchi et al. ............ 313/586 |
| 6,309,580 B1 * | 10/2001 | Chou ............................ 264/338 |
| 6,368,097 B1 | 4/2002 | Miller et al. |
| 6,677,243 B2 | 1/2004 | Okada et al. |
| 6,727,970 B2 | 4/2004 | Grace et al. |
| 6,846,172 B2 | 1/2005 | Vaughn et al. |
| 7,071,088 B2 | 7/2006 | Watts et al. |
| 7,099,525 B2 | 8/2006 | Bakir et al. |
| 7,112,049 B2 | 9/2006 | Fueller et al. |
| 7,168,939 B2 | 1/2007 | Bietsch et al. |
| 7,261,425 B2 | 8/2007 | Benson et al. |
| 7,276,278 B2 | 10/2007 | Kamiyama et al. |
| 7,320,772 B2 | 1/2008 | Otsuka |
| 2002/0139164 A1 | 10/2002 | Ishihara |
| 2002/0171026 A1 | 11/2002 | Kuroda |
| 2004/0038552 A1 | 2/2004 | Watts et al. |
| 2004/0042195 A1 | 3/2004 | Hwang |
| 2004/0106346 A1 | 6/2004 | Zafiroglu |
| 2004/0156108 A1 | 8/2004 | Chou et al. |
| 2005/0069603 A1 | 3/2005 | Vaughn et al. |
| 2007/0090567 A1 | 4/2007 | Hwang |

FOREIGN PATENT DOCUMENTS

| | | |
|---|---|---|
| JP | 2-150333 A | 6/1990 |
| JP | 4-1025 A | 1/1992 |
| JP | 5-318992 A | 12/1993 |
| JP | 11185642 A * | 7/1999 |
| WO | WO 02/056104 A2 | 7/2002 |
| WO | WO 02073712 A1 * | 9/2002 |

OTHER PUBLICATIONS

M Heckel and W K Schomburg. Review on micro molding thermoplastic polymers. (Dec. 17, 2003) J. Micromech. Microeng. 14.*

Jerrold E. Winandy, "Wood Properties", Encyclopedia of Agricultural Science, Academic Press, Oct. 1994, vol. 4, pp. 549-561.

* cited by examiner

MOLD FOR FABRICATING BARRIER RIB AND METHOD OF FABRICATING TWO-LAYERED BARRIER RIB USING SAME

CROSS REFERENCE TO RELATED APPLICATION

The present application is a continuation of U.S. Ser. No. 11/117,324, filed on Apr. 29, 2005, which claims priority of Application No. 2004-97649, filed in the Republic of Korea on Nov. 25, 2004. The entire contents of which is incorporated herein in their entirety by reference.

BACKGROUND OF THE INVENTION

1. Field of the Invention

The present invention relates, in general, to a mold for fabricating a barrier rib and a method of fabricating a two-layered barrier rib using the same and, more particularly, to a mold for fabricating a barrier rib that includes a plurality of tapered protruding parts and recessed parts having a shape corresponding to embossed portions of the barrier rib, and a method of fabricating a two-layered barrier rib for inkjet application using the same through a low-cost simple process.

2. Description of the Related Art

Figure 1:
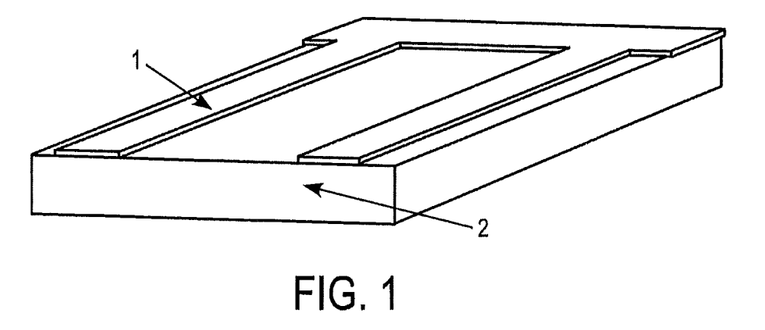
FIG. 1 schematically illustrates a barrier rib for displays.

As shown in FIG. 1, a conventional barrier rib for display devices has a vertically and horizontally striped structure so as to discriminate RGB pixels on a transparent glass substrate 2. A space between the barrier ribs is empty and the adjacent surface is flat and transparent to at least one wavelength so that light penetrates it. In a color filter for liquid crystal displays, an organic black matrix formed on the glass substrate may be exemplified as an application of barrier rib structure.

Methods of fabricating the color filter for liquid crystal displays is classified into various methods, such as a pigment dispersion method, a printing method, a dyeing method, an electrode position method, a photolithographic method, and an inkjet printing method. Among them, the inkjet printing method has drawn much attention from the display industries in recent years because it has advantages in that, since it is possible to simultaneously produce red (R), green (G), and blue (B) color filters, the process is simple, the amount of material used is reduced, and thus the production cost is low.

According to the inkjet printing method, predetermined patterns, what is commonly called a barrier rib structure formed on a substrate, are prepared and the recessed parts of the barrier rib are filled with colored resins (R, G, and B) to fabricate a color filter. When an embossing process or an imprinting process employed for fabricating barrier ribs, a deformable composition for the barrier rib is pressed using the mold having a predetermined pattern, and cured, and the mold is removed, thereby forming the barrier rib structure on the substrate. In other words, it is possible to apply the embossing process to fabricate a micropattern or a barrier rib. The embossing process may be classified into a thermal embossing process, in which curing is conducted by temperature variation, and a UV embossing process, in which curing is conducted by UV radiation, according to a method of forming a solidified pattern. In the thermal embossing process, if material of the barrier rib is thermoplastic, the material is heated at a glass transition temperature or higher so as to be deformable or fluidic at the molding temperature, pressure is applied thereto to conduct embossing, the resulting material is solidified (more strictly speaking, glassified) by cooling after a pattern is formed, and the mold is removed. Meanwhile, when using thermosetting material, the material of the barrier rib having fluidity is embossed, heated, and cured, and then the mold is removed.

Figure 2:
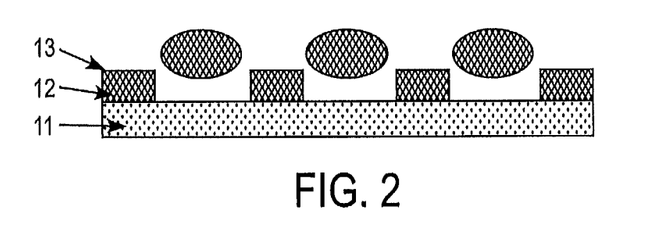
FIG. 2 is a schematic sectional view of a conventional two-layered barrier rib.

With respect to a conventional method of preventing the nonuniform spread or mix-up between the adjacent pixels and staining of the barrier rib's surface by resins of color filter printed in an inkjet manner, Japanese Patent Laid-Open Publication No. 2001-42313 discloses a method of neatly applying ink to an ink receiving structure between barrier ribs (see FIG. 2).

In other words, as shown in FIG. 2, a barrier rib is patterned on a glass substrate 11 using photolithographic methods so as to have a structure consisting of two layers 12, 13. A lower layer 12 of the barrier rib is made of a hydrophilic material that has affinity to hydrophilic ink and an upper layer 13 is made of hydrophobic material that has an aversion for ink so that the glass substrate 11 easily receives ink, and vice versa in the case of water-based ink. However, if the barrier rib is fabricated through the above methods, undesirably, a plurality of complicated coatings, mask aligning steps and exposure processes must be carried out.

Furthermore, there exist methods of employing materials having different surface properties or of conducting treatment using them so as to easily receive ink through a procedure similar to that of Japanese Patent Laid-Open Publication No. 2001-42313 as described above. For example, Japanese Patent Laid-Open Publication No. 2000-89022 discloses a method of conducting exposure while an ink receiving layer is hidden using a black matrix made of a resin composition having a light blocking property. Japanese Patent Laid-Open Publication No. 2000-28819 discloses a method of polishing an ink receiving layer to flatten it, Japanese Patent Laid-Open Publication No. Hei. 11-194211 discloses a method of forming a second layer on a metal black matrix. Korean Patent Laid-Open Publication No. 2001-110183 discloses a surface treatment method using a plasma.

However, all of the above methods need at least one additional photolithography process which incurs a high cost, particularly because of a surface treatment or the use of costly devices and fine chemicals in great quantities. Therefore, there remains a need to develop a mold capable of fabricating a barrier rib employing a simple low-cost process and an embossing method of fabricating the barrier rib using the mold.

SUMMARY OF THE INVENTION

The present inventors have conducted extensive studies into the solutions of problems occurring in the prior art, resulting in the finding that, when employing a mold for fabricating a barrier rib, which includes a plurality of tapered protruding parts and a plurality of recessed parts, and an embossing process according to the present invention, it is possible to relatively simply fabricate a two-layered barrier rib for inkjet applications, which includes an ink-philic layer and an ink-phobic layer, through a single embossing process, thereby accomplishing various aspects of the present invention.

Therefore, an object of the present invention is to provide a mold for fabricating a barrier rib, which is capable of fabricating a two-layered barrier rib through a single embossing process.

Another object of the present invention is to provide a method of relatively simply fabricating the two-layered barrier rib which includes an ink-philic layer and an ink-phobic layer using the mold for fabricating the barrier rib through the single embossing process.

Still another object of the present invention is to provide a two-layered barrier rib for inkjet application fabricated through the above method of fabricating the barrier rib.

In order to accomplish the above objects, according to an aspect of the present invention, there is provided a mold for fabricating a barrier rib. The mold comprises a plurality of protruding parts and a plurality of recessed parts. The protruding parts and the recessed parts are arranged at regular intervals, and the recessed parts have a shape corresponding to embossed ink barrier portions to be fabricated. The protruding parts have shapes corresponding to depressed portions of the barrier rib to be fabricated, protrude adjacent to the recessed parts, and are tapered, therefore each protruding part of the mold has a triangular loop-like shape (See FIGS. 3a and 3b). This tapered shape of the mold makes the process simple as shown in later. Accordingly, the surface of recessed part of embossed barrier rib structure is not flat rather grooved, however, it is almost flat as long as the apex angle of the top of the protruding part is not much less than 180°.

According to another aspect of the present invention, there is provided a method of fabricating a barrier rib. The method comprises (i) applying ink-philic material on a transparent substrate to form a lower ink-philic layer; (ii) applying ink-phobic material on the ink-philic layer to form an upper ink-phobic layer; (iii) providing the mold for fabricating the barrier rib according to claim 1 on the ink-phobic layer and leaving the resulting structure for a predetermined time; (iv) radiating UV onto the backside of the transparent substrate or applying heat to conduct curing; and (v) removing the mold.

According to still another aspect of the present invention, there is provided a barrier rib fabricated through the above method.

BRIEF DESCRIPTION OF THE DRAWINGS

The above and other objects, features and advantages of the present invention will be more clearly understood from the following detailed description taken in conjunction with the accompanying drawings, in which:

FIG. 3b is a sectional view taken along the line A-A' of FIG. 3a;

FIGS. 4a-4e illustrates the fabrication of a two-layered barrier rib using the mold to for fabricating the barrier rib, according to embodiments of the present invention;

FIG. 7c illustrates two-dimensional micro-Raman mapping results of a patterned section of FIG. 7a.

DESCRIPTION OF THE PREFERRED EMBODIMENTS

Hereinafter, a detailed description will be given of the present invention, referring to the accompanying drawings.

The present invention relates to a mold which is used to fabricate a barrier rib, such as an organic black matrix of an inkjetted color filter for a liquid crystal display. In the mold of the present invention, since a protruding part protrudes adjacent to a recessed part and is tapered, two deformable layers having different ink-philicity constituting the barrier rib is pressed and solidified at the same time, thus it is possible to simply fabricate a two-layered barrier rib using a single embossing process at a low cost.

Figure 3A:
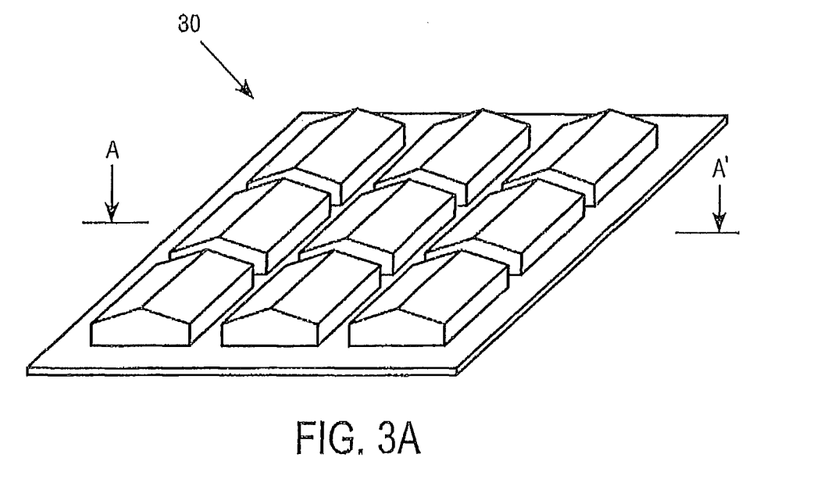
FIG. 3a illustrates a three-dimensional structure of a mold for fabricating a barrier rib, according to embodiments of the present invention.
Figure 3B:
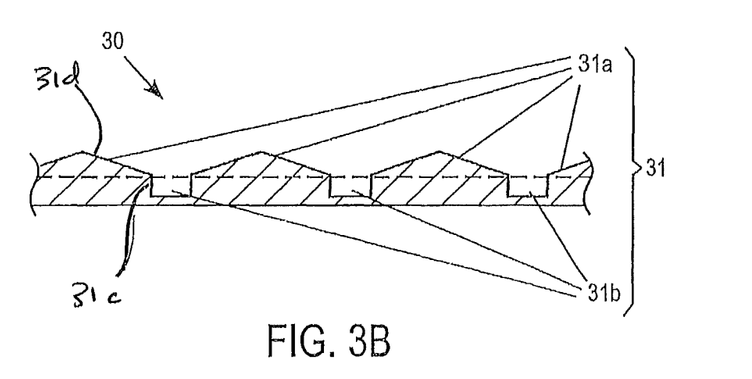
Figure 3C:
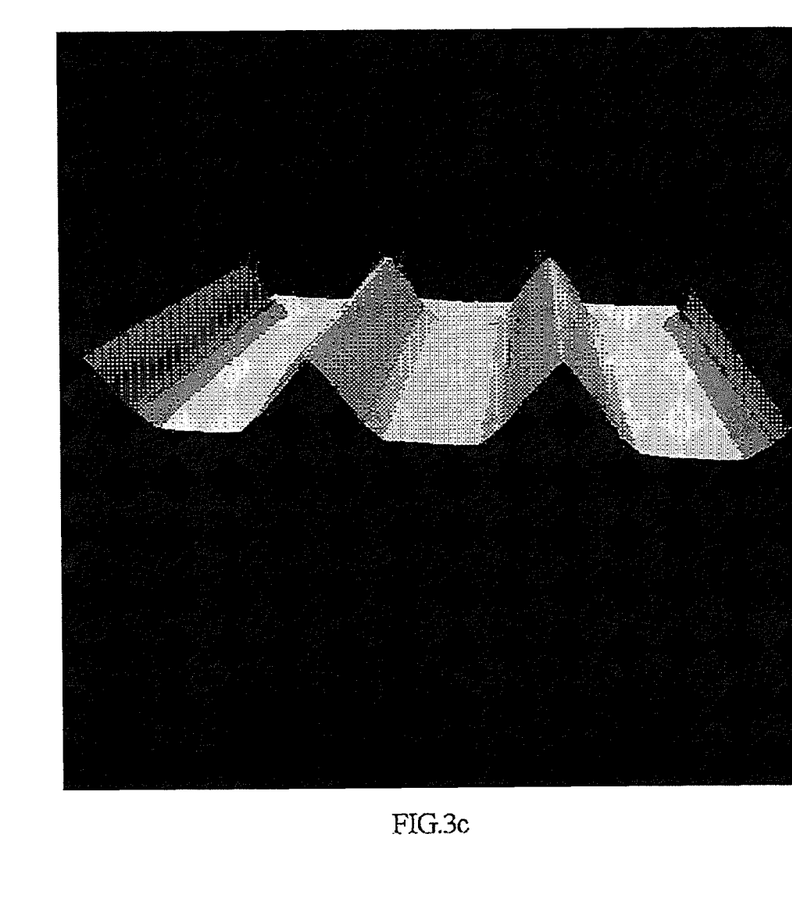
FIGS. 3c and 3d are confocal laser scanning microscope images which show the three-dimensional structure of the mold for fabricating the barrier rib, and the embossed structure after completion of embossing process, according to embodiments of the present invention, respectively.
Figure 3D:
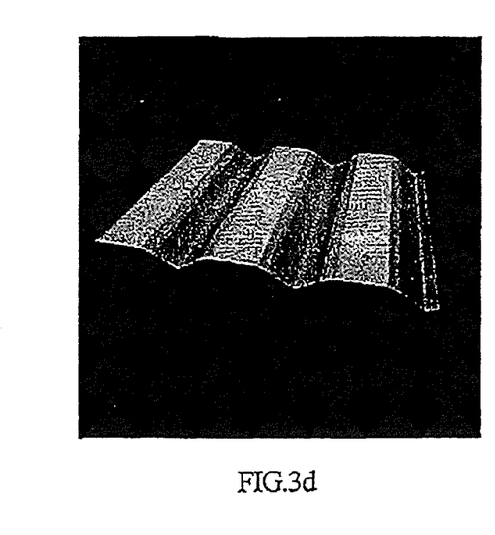

FIG. 3a illustrates a three-dimensional structure of the mold for fabricating the barrier rib according to the present invention. With reference to FIG. 3a, a mold 30 for fabricating the barrier rib according to the present invention includes a predetermined pattern 31 in which a plurality of protruding parts 31a and a plurality of recessed parts 31b are repeatedly arranged at regular intervals. As shown in FIG. 3b, the protruding parts 31a have a shape corresponding to depressed portions of the barrier rib to be fabricated, protrude adjacent to the recessed parts 31b, and are tapered, therefore has a pentahedral triangular loop-like shape. FIG. 3c is confocal laser scanning microscope image which shows the three-dimensional structure of the mold for fabricating the barrier rib, according to embodiments of the present invention, and FIG. 3d is the embossed structure after completion of the present process. As shown in FIG. 3c, edges of the protruding parts 31a of the mold according to embodiments of the present invention may have a pointed shape which is formed by meeting two sides at a predetermined angle, or a rounded edge shape, if necessary. In exemplary embodiments of the present invention, the mold may be made of any material, such as silicon, metal, plastic, glass, semiconductor, or insulating material.

The fabricating method of the mold of the present invention having tapered protruding parts includes well-known conventional fabrication techniques for three-dimensional micro electro-mechanical systems (MEMS) such as a holographic lithography, anisotropic wet etching, LIGA, direct laser writing using excimer laser and so forth.

Another aspect of the present invention is characterized in that the mold for fabricating the barrier rib and an embossing process are employed to fabricate a two-layered barrier rib for inkjet application which includes an ink-philic layer and an ink-phobic layer. Hereinafter, a method of fabricating the two-layered barrier rib will be exemplified, but the method of the present invention may be applied to a multilayered barrier rib having two or more layers.

FIG. 4 illustrates the fabrication of a barrier rib using a mold 21 for fabricating the barrier rib according to the present invention through a single embossing process. With reference to FIG. 4, in order to fabricate a two-layered barrier rib for inkjet application using the mold 21 for fabricating the barrier rib according to the present invention, ink-philic material is applied on a transparent substrate 24 to form an ink-philic layer ("lower layer": 23), and ink-phobic material is then applied on the ink-philic layer 23 to form an ink-phobic layer ("upper layer": 22).

Material for the transparent substrate which is used to fabricate the barrier rib of the exemplary embodiments of the present invention is not limited, and may be properly selected from an inorganic substrate and an organic substrate, depending on the application of the barrier rib. The substrate is not necessarily transparent when the hot embossing method is employed, however, transparent substrate is chosen as a representative example because the main application area of the present invention is display-related one.

The method of forming the ink-phobic layer 22 or the ink-philic layer 23 is not limited, and a suitable method (for example, a spin coating method or a dip coating method) may be chosen according to circumstances.

When using a hydrophilic ink such as water or alcohol based solutions, the ink-philic layer 23 is made of hydrophilic material, and the ink-phobic layer 22 is made of hydrophobic material. When using an oily ink, the ink-philic layer 23 is made of the hydrophobic material, and the ink-phobic layer 22 is made of the hydrophilic material.

According to the processing feature of the present invention, the viscosity of the lower layer must be higher than that of the upper layer when the mold is pressed to maintain the desirable two-layer structure. Therefore, material having lower viscosity at a molding temperature is used as the ink-phobic material constituting the ink-phobic upper layer 22, and material having higher viscosity at a molding temperature is used as the ink-philic material constituting the ink-philic lower layer 23. The viscosity of each layer can be selected by controlling their composition or degree of polymerization.

Illustrative, but non-limiting examples of the hydrophobic materials available to the present invention include isoprene, styrene, acrylate containing fluorine, methacrylate containing fluorine, monomers thereof, oligomers thereof, homopolymers or copolymers thereof, or organic or inorganic complexes containing silicon. Preferably, the hydrophobic material is exemplified by ORMOCER which is manufactured by Microresist Co., Germany.

Illustrative, but non-limiting examples of the hydrophilic material available to the present invention include polyethylene glycol, polyurethane, polyamide, poly(2-hydroxy ethyl methacrylate), monomers thereof, oligomers thereof, or homopolymers or copolymers thereof.

Inorganics, such as silicone subjected to surface modification or carbon nanotubes, may be added to the ink-phobic layer 22 and the ink-philic layer 23 so as to control hydrophilic and hydrophobic properties, but the kind of material is not limited. Additionally, in the present invention, a UV initiator (for example, Irgacure 184), a heat initiator (for example, AIBN: 2,2'-Azobisisobutyronitrile), a crosslinking agent, a pigment, a dye, and a surfactant may be added to the ink-phobic layer composition or the ink-philic layer composition, if necessary, but their kind is not limited. Material that is more flexible than the mold 21 for fabricating the barrier rib and is deformable or fluidic is used as material for forming the ink-phobic layer 22 and the ink-philic layer 23.

After the ink-philic layer 23 and the ink-phobic layer 22 are formed on the transparent substrate 24, the ink-phobic layer 22 is positioned so as to face protruding parts of the mold 21 for fabricating the barrier rib according to exemplary embodiments of the present invention. The mold comes into contact with the ink-phobic layer 22 while heat, or pressure, or heat and pressure are applied thereto, if necessary, and then left for a predetermined time. As shown in FIG. 4b, if the mold 21 for fabricating the barrier rib is positioned on the ink-phobic layer 22 and a predetermined pressure is then applied thereto to deform material of the ink-phobic layer 22, stress is focused only on the ink-phobic layer 22 because the material of the ink-phobic layer 22 has lower viscosity than the material of the ink-philic layer 23, thus only the ink-phobic layer 22 deforms or flows as shown at reference number 25. In this respect, the applied pressure may depend on the desired height of the barrier rib.

Figures 4A, 4D:
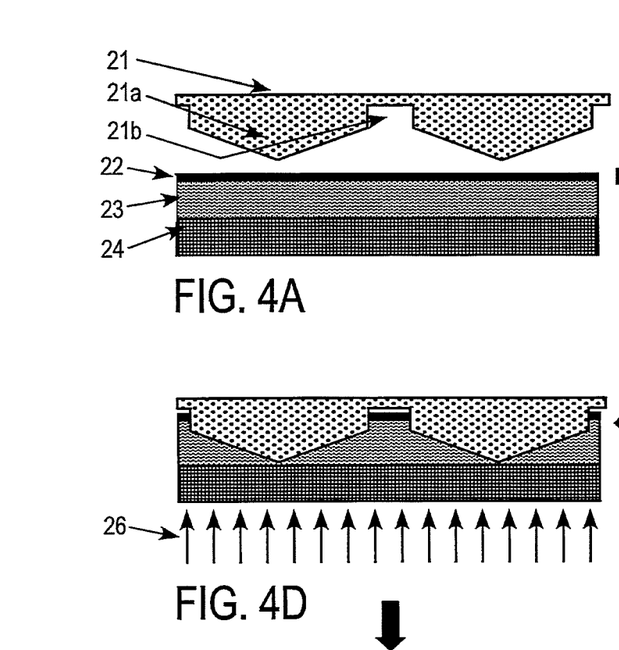
Figure 4B:
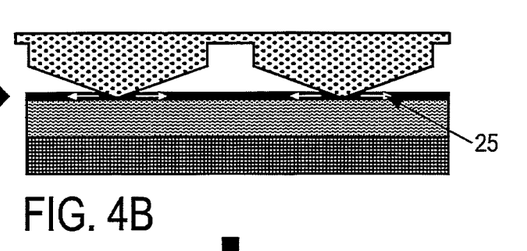
Figure 4C:
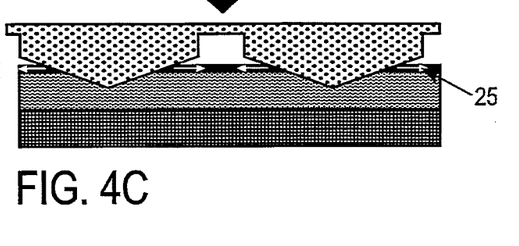

As shown in FIG. 4c, even though deformation occurs after the mold comes into contact with the lower layer, the upper layer and the lower layer do not mix with each other because of a difference in viscosity and hydrophilicity, and the final deformation is assured while the upper and the lower layer are maintained as they are after a predetermined time (FIG. 3d).

Figure 4E:
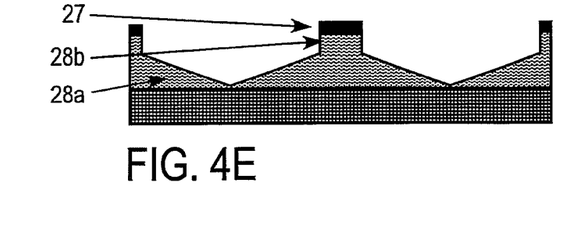

As shown in FIG. 4d, UV 26 irradiates to the backside of the transparent substrate or heat is applied particularly to the resins to cure the barrier rib, and then the mold is removed, thereby creating a structure as shown in FIG. 4e, in which an ink receiving layer 28a having an affinity to ink is formed on a transparent substrate, an ink-philic barrier rib portion 28b having an affinity to ink is formed below the barrier rib, and the barrier rib 27 having an aversion for ink is formed thereon.

In the present invention, it is possible to adjust the height of the ink-philic barrier rib portion 28b or to remove it by controlling the amount of material of the ink-philic layer of FIG. 4a or controlling the pressure applied to the mold, depending on the purpose.

Figure 5:
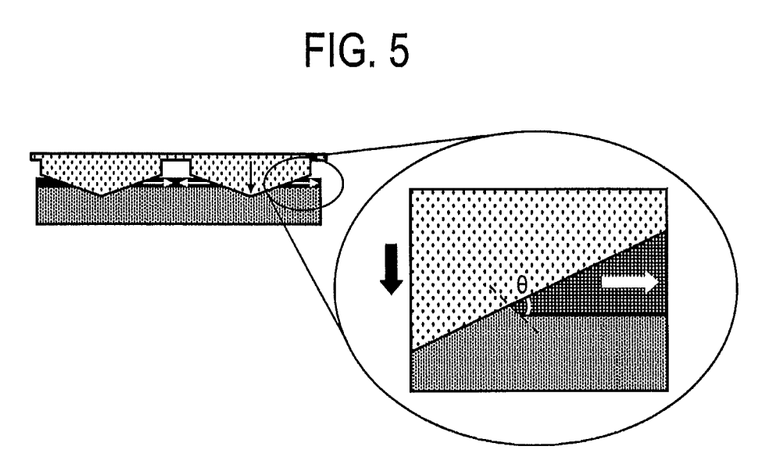
FIG. 5 illustrates the mold in an embossing step and deformation of a two layers in the course of fabricating the two-layered barrier rib according to embodiments of the present invention.

FIG. 5 illustrates the mold in an embossing step and deformation (flow) of two layers. If the mold is subjected to a surface treatment process or a coating process so as to have a hydrophilic or hydrophobic property like the ink-philic layer (lower layer), the ink-phobic layer (upper layer) having the low viscosity meets the mold at a high angle of θ between the mold having an affinity for ink and the lower layer, thus the mechanical mixing of the upper and the lower layer does not take place during the embossing unless the pressing speed is not fast. Furthermore, the Reynolds number of the upper layer has the following value under typical embossing conditions:

$$Re \sim \frac{LV\rho}{\eta} \sim \frac{(1\times 10^{-5}\text{ m})(1\times 10^{-5}\text{ m}\cdot\text{sec}^{-1})(10^{3}\text{ kg/m}^{3})}{(10^{-2}\,kgm^{-1}\text{sec}^{-1})} \sim 10^{-5} \quad \text{Equation 1}$$

Therefore, Re is low enough to guarantee an absence of vortex, turbulence or a secondary flow during embossing. In other words, the flow is a stable and laminar flow. In addition, the possibility of the presence of a residual top resin on the outer surface of the bottom layer is significantly lowered.

After the mold of exemplary embodiments of the present invention is left for a predetermined time, typically from zero to several tens of seconds, UV irradiates to the backside of the transparent substrate or heat is applied to cure the ink-philic layer composition and the ink-phobic layer composition. Finally, the mold is removed, thereby fabricating the barrier rib of the present invention.

The mold of embodiments of the present invention may be applied to a barrier rib, used to fabricate a color filter for liquid crystal displays, employing an inkjet printing method, a display part of a organic light emitting display, or an organic thin film transistor, a barrier rib for a display part of a flexible display, or an electrophoresis display or an electrowetting display, or a PDP cell, or a barrier rib for a combinatorial test plate.

A better understanding of the present invention may be obtained in light of the following examples which are set forth to illustrate, but are not to be construed to limit the present invention.

EXAMPLE 1

Fabrication of a Two-layered Barrier Rib for an Inkjet Printing Color Filter, which has a Hydrophilic lower layer and a Hydrophobic Upper Layer, Through a UV Embossing Process A monomer mixture liquid of 70 wt % aliphatic urethane-acrylate telechelic oligomer (Ebecryl 284 manufactured by UCB, Inc.) and 30 wt % hexanediol diacrylate (HDDA manufactured by UCB, Inc.), which had viscosity of 10,000 mPa·sec, as a solvent-free hydrophilic UV-curable material, was mixed with 0.75 wt % bisacylphosphine oxide (BAPO) as a photoinitiator based on the total monomer mixture liquid, and the resulting mixture was applied on a glass substrate having a thickness of 0.7 mm at 500 rpm for 30 sec to form an ink-philic layer (lower layer). having a thickness of 8 μm. 2,2,3,3-tetrafluoropropyl methacrylate monomer (viscosity of 10 mPa·sec) as hydrophobic UV curable material, which contained 0.1 wt % solvent-free fluorine-based surfactant (FC-430 manufactured by 3M Co.) and 1.0 wt % BAPO, was blade coated in a thickness of 1 μm to form an ink-phobic layer (upper layer). Subsequently, a mold for fabricating a barrier rib according to embodiments of the present invention as shown in FIG. 3a was brought into close contact with the entire surface of the upper layer, pressure of 5 kgf/cm² was applied thereto, and the resulting structure was left for 30 min. Thereafter, the backside of the glass substrate was exposed to UV of 1 kW for 3 min using a UV exposing machine, and the mold was then removed.

EXAMPLE 2

Fabrication of a Barrier Rib for an Inkjet Printing OLED, which has a Hydrophobic Lower Layer and a Hydrophilic Upper Layer, Through a UV/Hot Embossing Process A surface of a mold was coated with a fluorine-based surfactant (Zonyl manufactured by DuPont, Inc.) and baked at 200° C. so as to have a hydrophobic property. Poly(2,2,3,3-tetrafluoropropyl methacrylate) having a molecular weight of 100,000 (a glass transition temperature of about 66° C.) was dissolved in methylisobutylketone (MIBK) so as to have a concentration of 5 wt %, and applied on a glass substrate using a spin coater at a rotation rate of 2000 rpm to form a lower layer. 2-hydroxyethyl methacrylate oligomer, which was produced by dissolving Irgacure 184 and polymerizing it through UV polymerization until the viscosity was 1,000 mPa·sec, was applied thereon at a rotation rate of 2000 rpm. Subsequently, the mold for fabricating a barrier rib according to the present invention was brought into close contact with the entire surface of an upper layer, embossing was conducted while the temperature of the mold and the glass substrate was set to 145° C. and pressure was set to 5 kgf/cm², and the resulting structure was left for 30 min. Thereafter, the backside of the glass substrate was exposed to UV of 1 kW for 3 min using a UV exposing machine, and the mold was then removed.

EXAMPLE 3

Fabrication of a Barrier Rib for an Inkjet Printing OLED, which has a Hydrophobic Lower Layer and a Hydrophilic Upper Layer, Through a UV Embossing Process The surface of a mold was coated with a fluorine-based surfactant (Zonyl manufactured by DuPont, Inc.) and baked at 200° C. so as to have a hydrophobic property. ORMOCER B59 manufactured by Microresist Co., that is, hydrophobic organic/inorganic hybrid UV curable resin, was applied on a glass substrate using a spin coater at a rotation rate of 3000 rpm. 2-hydroxyethyl methacrylate (HEMA) monomer containing Irgacure 184 was applied thereon in drops of 1 ml using a pipette. Subsequently, the mold for fabricating a barrier rib according to the present invention was brought into close contact with the entire surface of an upper layer, embossing was conducted at room temperature and pressure of 5 kgf/cm², the backside of the glass substrate was exposed to UV of 1 kW for 3 min using a UV exposing machine, and the mold was removed.

Figure 6A:
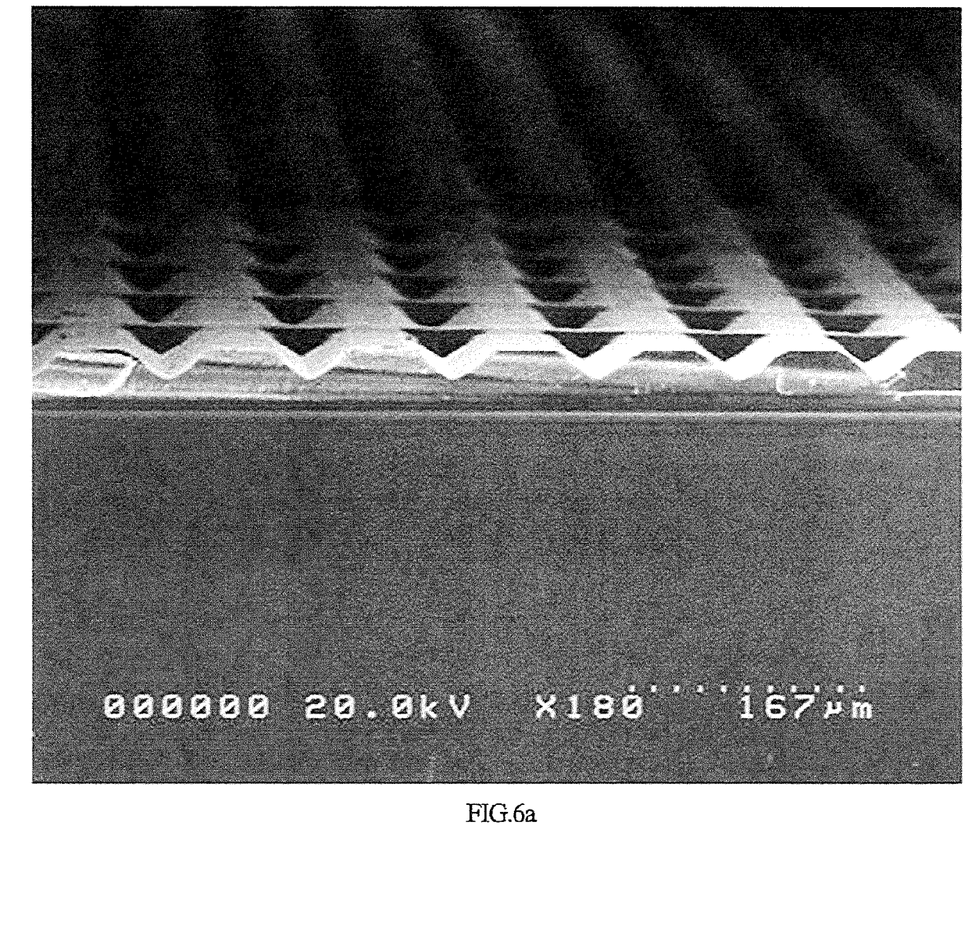
FIGS. 6a and 6b are SEM pictures of the barrier rib fabricated according to the present invention.
Figure 6B:
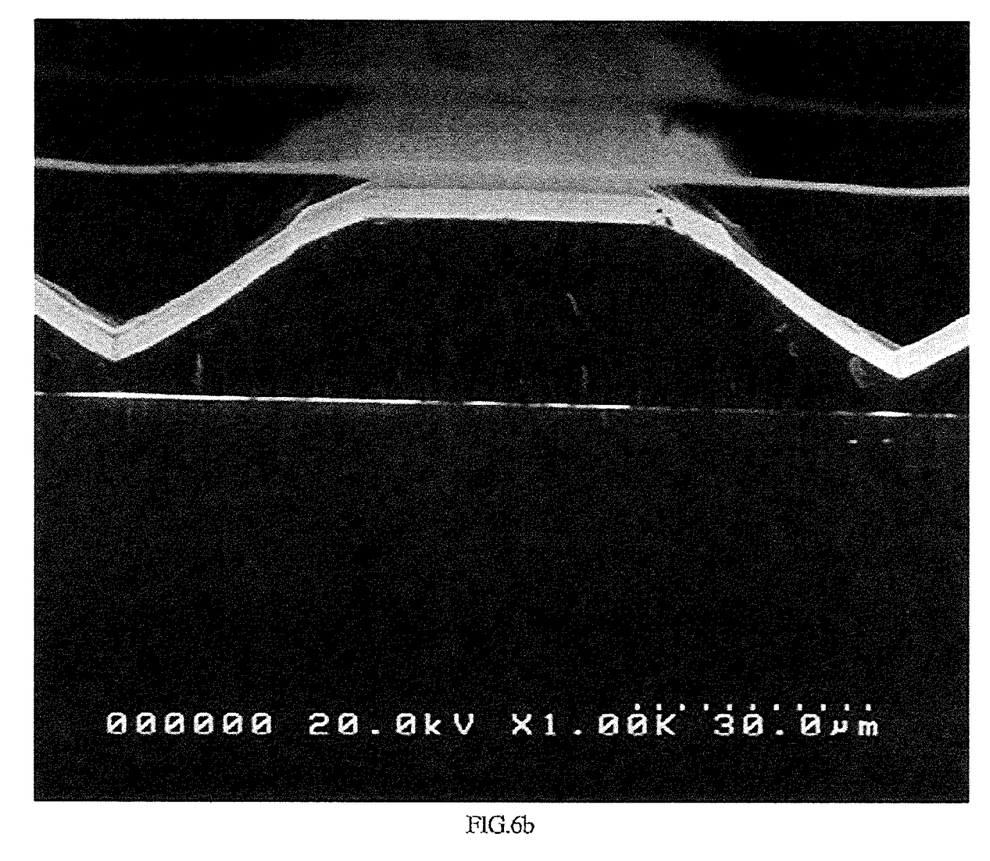

SEM pictures of the barrier rib fabricated in example 3 are shown in FIGS. 6a and 6b. As shown in FIGS. 6a and 6b, in the mold of the present invention, protruding parts are tapered and edges may have a rounded shape.

Figure 7A:
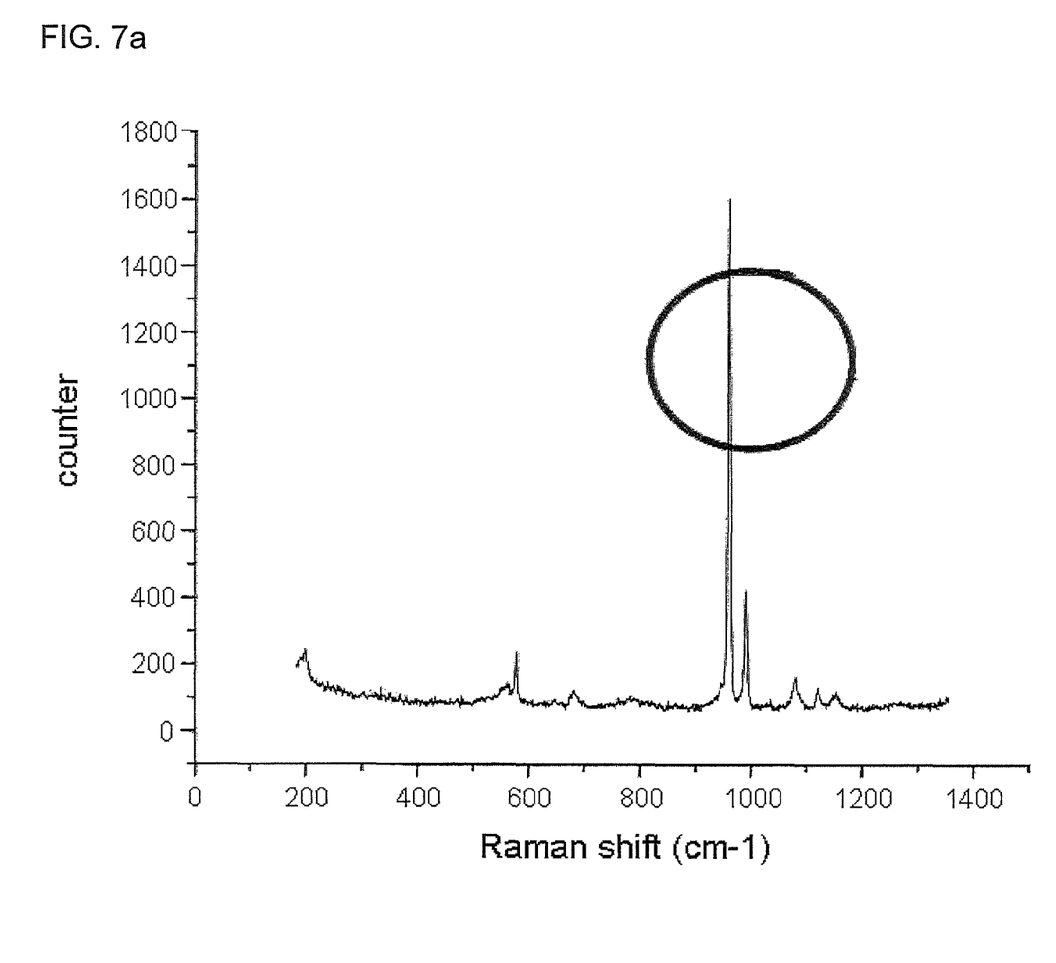
FIG. 7a illustrates Raman spectrum of ORMOCER used as an ink-philic material according to embodiments of the present invention to probe the presence of ink-phobic material HEMA on the ink-philic section.
Figure 7B:
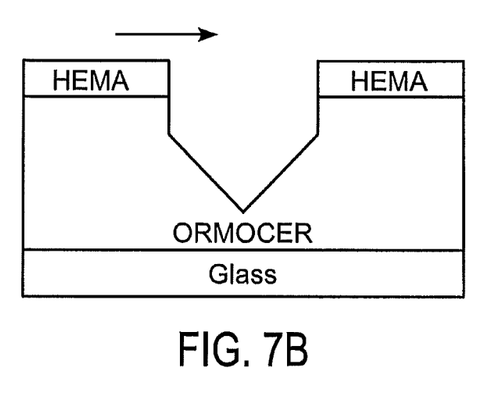
FIG. 7b illustrates the barrier rib used in the Raman image mapping measurement.
Figure 7C:
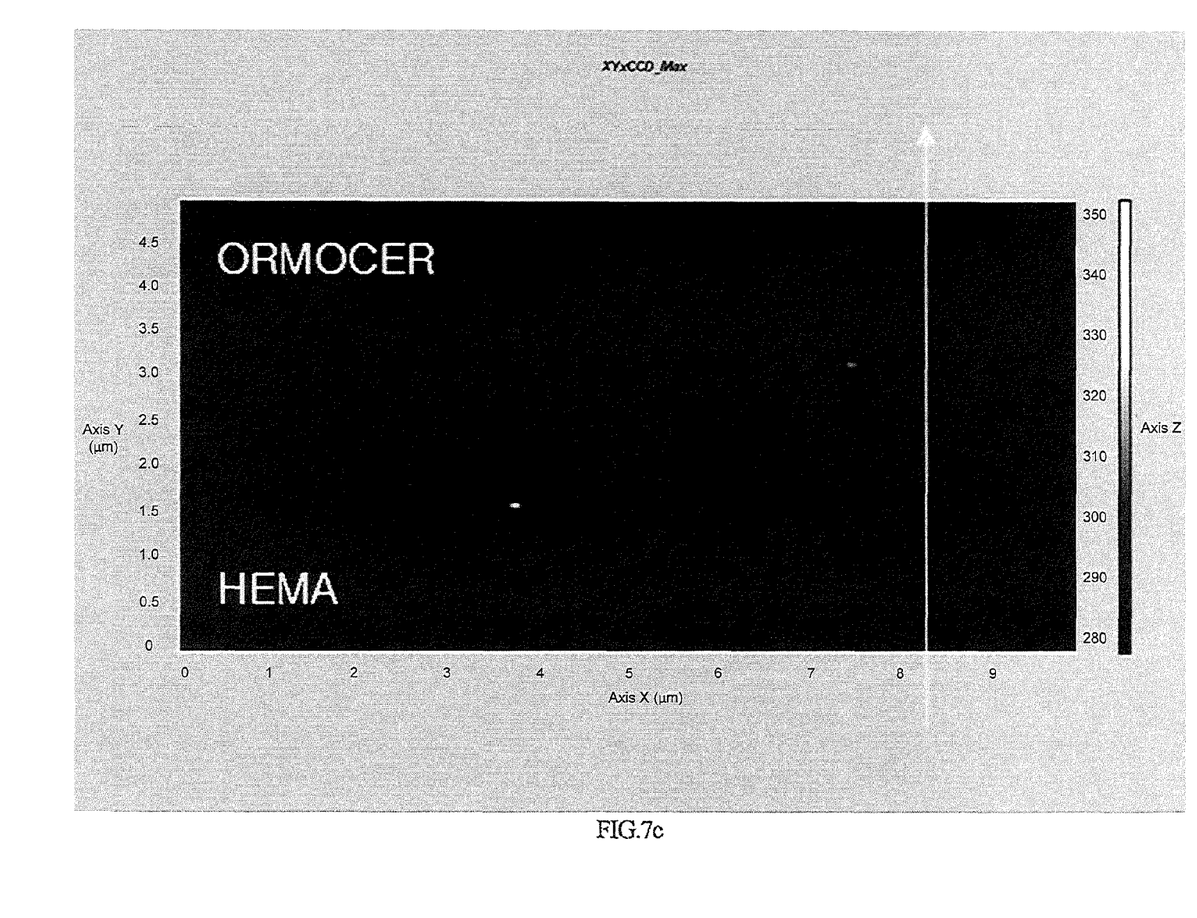
Figure 7D:
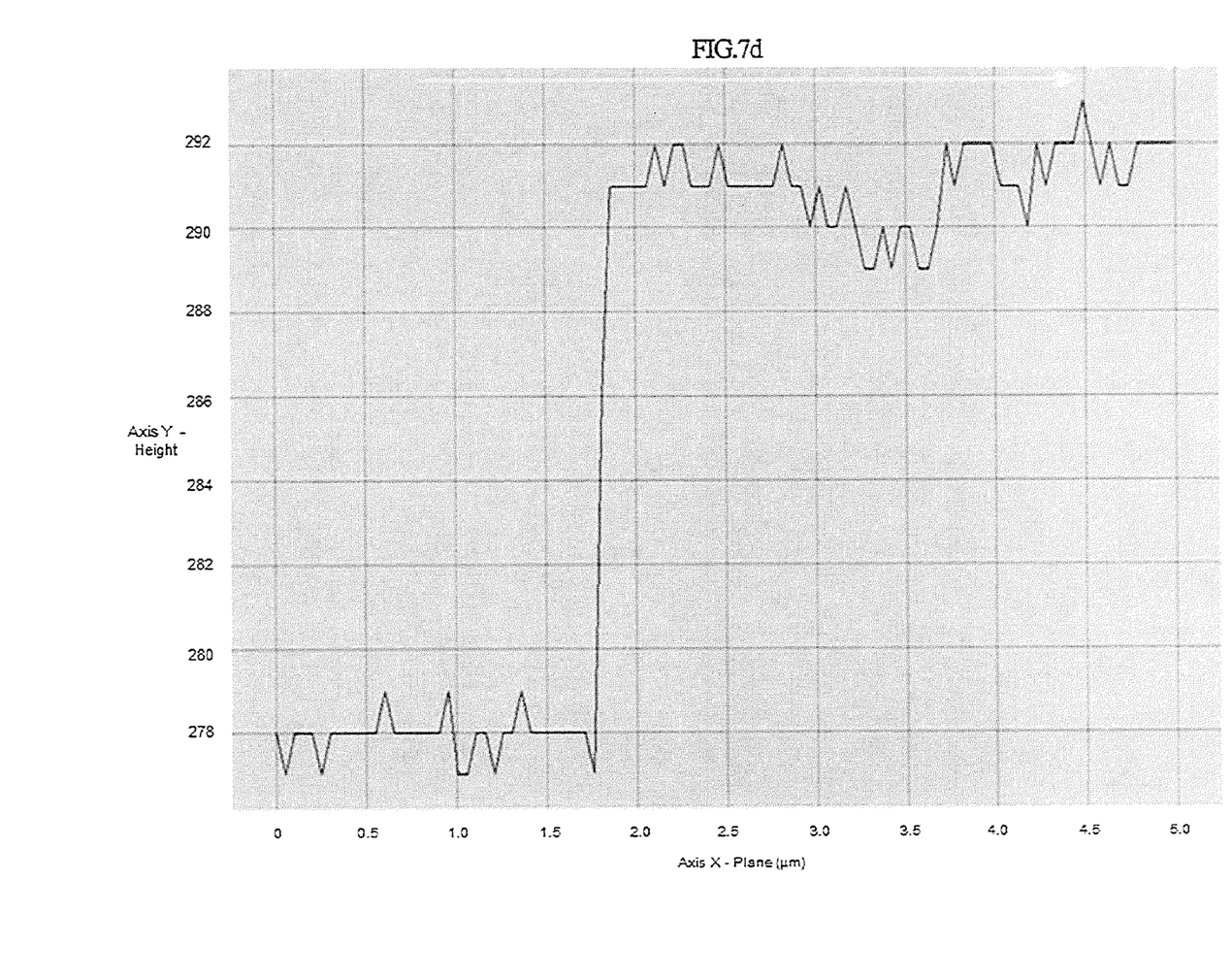
FIG. 7d is a graph of Raman intensity of ORMOCER in the direction of the arrow of FIG. 7b.

To evaluate the distribution of ORMOCER and HEMA in a section of the mold fabricated in example 3, two-dimensional micro-Raman image mapping measurement was conducted using Nanofinder 30 (Tokyo Instruments), and the results are shown in FIGS. 7a to 7d. As shown in FIG. 7a, a peak corresponding only to ORMOCER was observed using the Raman spectrum. The section which was patterned so as to have the above peak was mapped in the direction of the arrow of FIG. 7b, thereby obtaining two-dimensional distribution as shown in FIG. 7c. Experimental conditions were set so that a diode laser was 785 nm, a point was 100, a step was 100, a shift speed was 2, and an exposure time was 0.5 sec. The intensity variation of ORMOCER in the direction indicated by the arrow in FIGS. 7b and 7c are shown in FIG. 7d, and it can be confirmed that only HEMA was dispersed on the surface of the upper layer because the ORMOCER peak is almost 0 at the upper layer, and that only ORMOCER was dispersed on the lower layer because the ORMOCER peak is almost 100 at the lower layer. Accordingly, in the present invention, a two-layered barrier rib structure having different hydrophilicity is fabricated through a simple, single embossing process.

As described above, it is possible to fabricate a barrier rib comprising two layers having different physicochemical properties through a single low-cost process using a mold for fabricating the barrier rib of embodiments of the present invention without using complicated processes, costly lithography and high pressure devices. It is possible to easily and precisely form a pattern using the mold for fabricating the barrier rib, which has tapered protruding parts according to embodiments of the present invention.

What is claimed is:

1. A method of fabricating a two-layered barrier rib, comprising:
   (i) applying ink-philic material on a transparent substrate to form a lower ink-philic layer;
   (ii) applying ink-phobic material on the ink-philic layer to form an upper ink-phobic layer;
   (iii) positioning a mold for fabricating the barrier rib on the ink-phobic layer and applying a predetermined pressure thereto to deform material of the ink-phobic layer;

(iv) radiating UV or applying heat onto a backside of the transparent substrate to conduct curing; and (v) removing the mold;

wherein the mold comprises:
- a plurality of protruding parts; and
- a plurality of recessed parts, wherein, the protruding parts and the recessed parts are arranged at regular intervals, the recessed parts have a shape corresponding to embossed portions of the barrier rib to be fabricated, and the protruding parts have a shape corresponding to depressed portions of the barrier rib to be fabricated, protrude adjacent to the recessed parts, and are tapered, and wherein the lower ink-philic layer is arranged between the upper ink-phobic layer and the substrate; and said applying the predetermined pressure to deform the material of the ink-phobic layer includes deforming the lower ink-philic layer and the upper ink-phobic layer such that the two-layered barrier rib includes recessed portions that are ink-philic, and tapered projecting portions having tops that are ink-phobic.

2. The method as set forth in claim 1, wherein viscosity of the ink-phobic material is lower than viscosity of the ink-philic material.

3. The method as set forth in claim 1, further comprising applying after the mold is positioned in the step (iii).

4. The method as set forth in claim 1, wherein the ink-philic layer is made of hydrophilic material and the ink-phobic layer is made of hydrophobic material when a hydrophilic ink is used, and the ink-philic layer is made of the hydrophobic material and the ink-phobic layer is made of the hydrophilic material when an oily ink is used.

5. The method as set forth in claim 2, wherein the ink-philic layer is made of hydrophilic material and the ink-phobic layer is made of hydrophobic material when a hydrophilic ink is used, and the ink-philic layer is made of the hydrophobic material and the ink-phobic layer is made of the hydrophilic material when an oily ink is used.

6. The method as set forth in claim 4, wherein the hydrophobic material is one or more copolymers selected from the group consisting of isoprene, styrene, acrylate containing fluorine, methacrylate containing fluorine, monomers thereof, oligomers thereof, homopolymers or copolymers thereof, and organic or inorganic complexes containing silicon.

7. The method as set forth in claim 4, wherein the hydrophilic material is material selected from the group consisting of polyethylene glycol-, polyurethane-, polyamide-, and poly (2-hydroxy ethyl methacrylate)-based homopolymer or copolymer.

8. The method as set forth in claim 5, wherein the hydrophobic material is one or more copolymers selected from the group consisting of isoprene, styrene, acrylate containing fluorine, methacrylate containing fluorine, monomers thereof, oligomers thereof, homopolymers or copolymers thereof, and organic or inorganic complexes containing silicon.

9. The method as set forth in claim 5, wherein the hydrophilic material is material selected from the group consisting of polyethylene glycol-, polyurethane-, polyamide-, and poly (2-hydroxy ethyl methacrylate)-based homopolymer or copolymer.

10. The method as set forth in claim 1, further comprising surface treating or coating a surface of the mold using material constituting the ink-philic layer.

11. The method as set forth in claim 2, further comprising surface treating or coating a surface of the mold using material constituting the ink-philic layer.

12. The method as set forth in claim 1, further comprising conducting cooling to achieve curing between the steps (iv) and (v) when one or both of the ink-phobic material and the ink-philic material are thermoplastic material.

* * * * *